(12) United States Patent
Lyu

(10) Patent No.: US 6,356,312 B1
(45) Date of Patent: Mar. 12, 2002

(54) MPEG DECODER AND DECODING CONTROL METHOD FOR HANDLING SYSTEM CLOCK DISCONTINUITY

(75) Inventor: Hwa Young Lyu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/217,203

(22) Filed: Dec. 22, 1998

(30) Foreign Application Priority Data

Dec. 29, 1997 (KR) .............................................. 97/77141

(51) Int. Cl.⁷ .............................................. H04N 9/475
(52) U.S. Cl. .................... 348/512; 375/240.25
(58) Field of Search ................................ 348/512, 515, 348/497; 386/110, 65, 25; 370/350, 504, 507, 508, 509, 516, 517; 375/240.25

(56) References Cited

U.S. PATENT DOCUMENTS

| | | | |
|---|---|---|---|
| 5,521,922 A | | 5/1996 | Fujinami et al. |
| 5,598,352 A | | 1/1997 | Rosenau et al. |
| 5,661,728 A | * | 8/1997 | Finotello et al. ............. 370/503 |
| 5,715,176 A | * | 2/1998 | Mobini ........................ 386/75 |
| 5,790,543 A | * | 8/1998 | Cloutier ....................... 370/395 |
| 5,841,987 A | * | 11/1998 | Blatter et al. .......... 395/200.66 |
| 5,899,578 A | * | 5/1999 | Yanigihara et al. ........... 386/75 |
| 5,905,268 A | * | 5/1999 | Maturi et al. ................ 375/364 |
| 6,088,063 A | * | 7/2000 | Shiba ......................... 348/515 |

* cited by examiner

Primary Examiner—Victor R. Kostak
(74) Attorney, Agent, or Firm—Fleshner & Kim, LLP

(57) ABSTRACT

An apparatus and method for MPEG decoding are disclosed which control decoding without reference to the system time clock for a predetermined time period during a discontinuity of system time clock. Thus, an error caused by inconsistency between the system time clock and the time stamp due to delay of the video buffer is eliminated, thereby allowing normal decoding with A/V lip-synchronization.

15 Claims, 3 Drawing Sheets

MPEG DECODER AND DECODING CONTROL METHOD FOR HANDLING SYSTEM CLOCK DISCONTINUITY

BACKGROUND OF THE INVENTION

1. Field of the Invention

The present invention relates to a moving picture expert group (MPEG) decoding system, and more particularly to an MPEG decoder and MPEG decoding control method for discontinuity of system time clock (STC).

2. Discussion of the Related Art

Digitalization of information has already been developed extensively. As a result, the picture compressing technology is becoming the major concern for multimedia. An MPEG is the international standard for coding the digital data of moving picture and is considered as the most effective compressing technology in the multimedia environment. The MPEG technology is widely used as the compressing algorithm in communication, broadcasting, game and the like including a digital TV.

The digital TV has several advantages over the conventional television implemented by an analog mode. One such advantage is a superior picture and sound quality. The fine picture and sound quality are results of transmitting and displaying the picture and sound data by radio waves. Particularly, the modulation and demodulation processes are all performed in the digital mode which has minimal noise. The noise-resistivity of the digital mode allows broadcasting stations to provide broadcasting service by transmitting power with approximately one several hundredth of the power required in the analog mode.

Having multiple channels is the another advantage of the digital TV. Also, the analog mode can transmit only one program within a 6MHz band width. However, the digital mode can transmit up to four programs within the same 6MHz band width. Particularly, the MPEG2 technology compresses and restores the picture and sound data at high density allowing greater amount of data per band width.

FIG. 1 shows an MPEG decoder in the background art including a demultiplexer 11, an audio buffer 12, an audio decoder 13, a video buffer 14, a video decoder 15, and a monitor 16. When the audio/video (A/V) multiplexed bit streams are input, the demultiplexer 11 demultiplexes or divides the multiplexed A/V bit streams into audio bit streams and video bit streams. The divided audio bit streams and video bit streams are temporarily stored in the audio buffer 12 and the video buffer 14, respectively, for decoding, and output to the audio decoder 13 and the video decoder 15, respectively. The video decoder 15 eliminates overhead such as various header data and initial code, performs variable length decoding (VLD), dequantization, performs inverted discrete cosine transform (IDCT), and restores the pixel value of the original screen for the monitor 16.

The A/V multiplexed bit streams input to the demultiplexer 11 according to the system time clock (STC). The bit streams includes a decoding time stamp (DTS) indicating the time to decode each picture and a presentation time stamp (PTS) indicating the time to display the decoded or restored data, both the DTS and PTS being based upon the STC. The STC controls the timing of the entire decoding system and is synchronized with the clock used by an encoder. In addition, the encoder generates the DTS and the PTS according to the STC for both the A/V lip-synchronization and for the video decoding because a video signal has an internal delay.

Therefore, the demultiplexer 11 also restores the STC from the A/V bit streams and outputs the restored STC to the audio decoder 13 and the video decoder 15. However, during the restoration of the STC, a discontinuity of the STC may occur due to a change in channel or channel edition or a number of other reasons. For example, when local broadcasting bit streams are inserted while a central broadcasting, known as KBS is being encoded, the absolute value of the STC is altered which causes discontinuity of the STC. When data according to the STC of different encoders are received by the same receiver, discontinuity of the STC occurs.

If a STC discontinuity occurs, the demultiplexer 11 generates a discontinuity signal. The video decoder 15 checks the time stamp based on a previous STC to decode the bit streams until a discontinuity signal is received. Depending on the discontinuity signal output from the demultiplexer 11, the video decoder 15 checks the time stamp based on a new STC to decode the bit streams.

Therefore, if a discontinuity of the STC occurs, the bit streams produced based upon the previous STC is decoded according to the time stamp based upon a new STC for a predetermined time due to a delay of the video buffer 13. Rather than continuing to decode by checking the time stamp based on the previous STC, the decoding is performed by checking the DTS and the PTS based upon the new STC, i.e. the incorrect STC. As a result, an abnormal decoding occurs, thereby causing an error in the system. Moreover, the bit streams based on the previous STC are stored in the video buffer regardless of an altered STC value, thereby preventing the A/V lip synchronization.

SUMMARY OF THE INVENTION

Accordingly, an object of the present invention is to solve at least the problems and disadvantages of the related art.

An object of the present invention is to provide an apparatus and method for MPEG decoding control during a discontinuity of the system time clock.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an MPEG decoder includes a mode signal generator generating a mode signal for a predetermined time when a STC discontinuity occurs; an audio decoder decoding according to a basic synchronization without checking time stamp when the mode signal is received in the course of decoding the audio bit streams depending on the time stamp based on the STC; and a video decoder decoding according to a basic synchronization without checking time stamp when the mode signal is received in the course of decoding the video bit streams depending on time stamp based on the STC.

In an another embodiment of the present invention, an MPEG decoding control method according to the present invention includes the steps of generating a mode signal for a predetermined time when STC discontinuity occurs, and allowing an audio decoder and a video decoder to freely decode using a basic synchronization without checking time stamp for the predetermined time.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
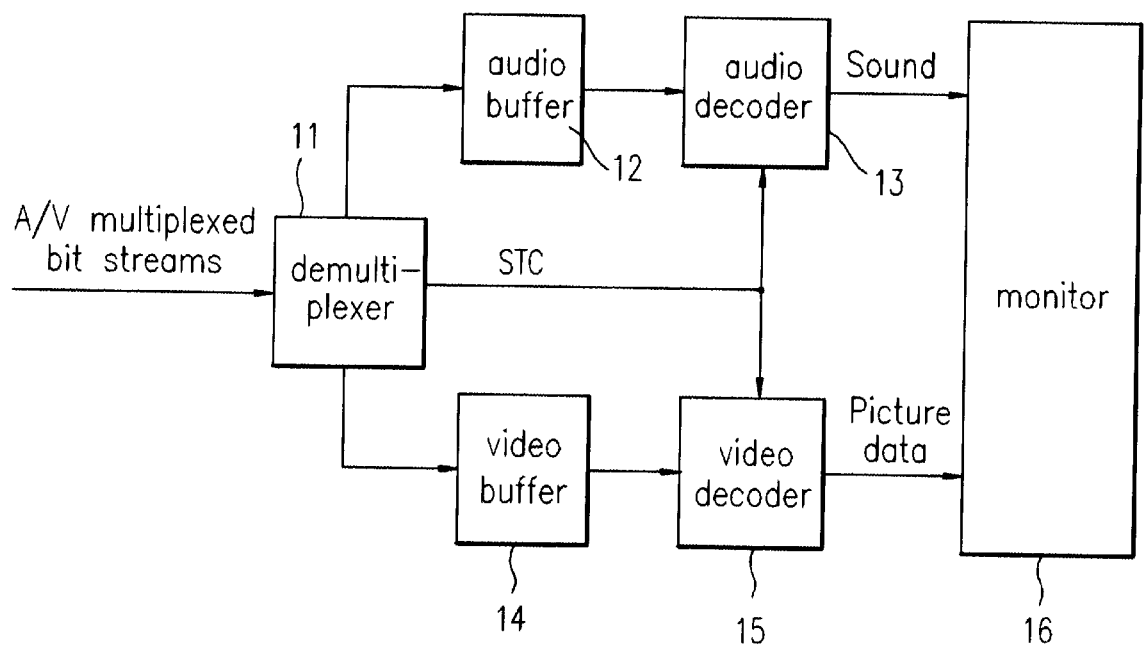
FIG. 1 is a block diagram of a MPEG decoder in the background art.
Figure 2:
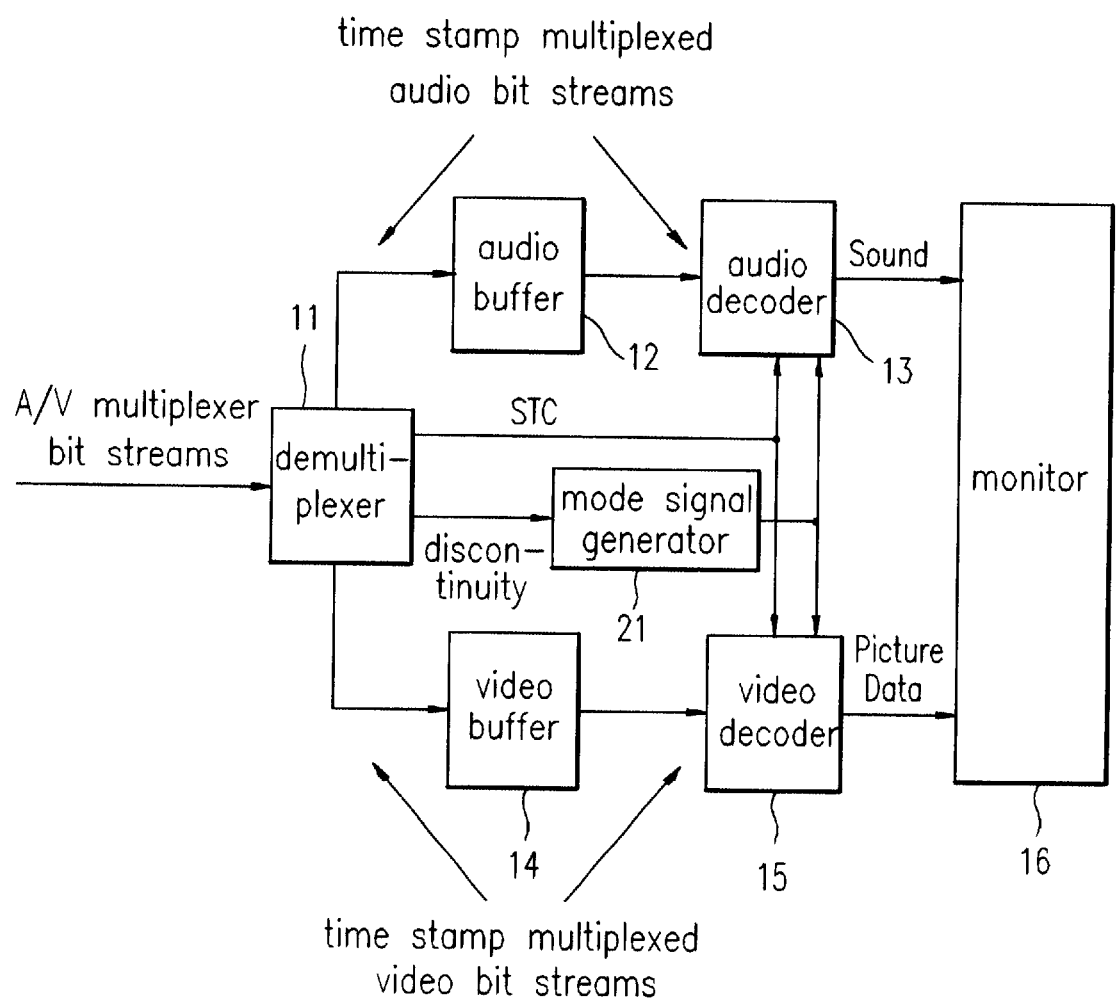
FIG. 2 is a block diagram of a MPEG decoder according to the present invention.

FIG. 2 shows a preferred embodiment of an MPEG decoder according to the present invention including a demultiplexer 11, an audio buffer 12, an audio decoder 13, a video buffer 14, a video decoder, and a monitor 16 as in the MPEG decoder of the background art as well as a mode signal generator 21. The mode signal generator generates a mode signal for a predetermined time if a STC discontinuity occurs due to a channel change or a channel edition or other reasons. Through the mode signal, the audio/video decoding is controlled.

When A/V multiplexed bit streams are input to the demultiplexer 11, the demultiplexer 11 divides the multiplexed A/V bit streams into audio bit streams and video bit streams. The divided audio bit streams and video bit streams are temporarily stored in the audio buffer 12 and the video buffer 14, and output to the audio decoder 13 and the video decoder 15, respectively. The A/V multiplexed bit streams also have multiplexed STC, DTS and PTS. Thus, the demultiplexer 11 restores the STC, which serves as the reference clock for the DTS and the PTS, and outputs the restored STC to the audio decoder 13 and the video decoder 15.

The audio decoder 13 and the video decoder 15 decode the audio bit streams and the video bit streams, respectively, according to the time stamp based upon the STC. The decoded bit streams are output to the monitor 16. Particularly, the video decoder 15 eliminates overhead such as various header data and initial code, performs VLD, dequantization, performs IDCT, and restores the pixel value of the original screen for the monitor 16.

The video decoder 15 checks the time stamp for each picture in reference to the STC while decoding the video bit streams in reference to the basic synchronization. The video bit streams may be timely decoded by time stamps within a predetermined range of error. However, if the time stamp departs from the predetermined range of error, a skip or a wait is utilized to regain the A/V lip-synchronization.

Generally, if the mode signal is '1', the audio decoder 13 and the video decoder 15 decode by checking the time stamp. If the mode signal is '0', the audio decoder 13 and the video decoder 15 perform decode by the basic synchronization without checking the time stamp.

The demultiplexer 11 outputs a discontinuity signal indicating a STC discontinuity to the mode signal generator 21 if a STC discontinuity occurs due to a channel change or a channel edition or other reasons. The mode signal generator 21 maintains the mode signal as '0' for a predetermined time of N seconds (where N is a natural number of 1 or more) when the discontinuity signal is received. Accordingly, the mode signal of '0' is output to the audio decoder 13 and the video decoder 15 during the STC discontinuity. Otherwise, the mode signal generator 21 does not receive a discontinuity signal and outputs a mode signal of '1' to the decoders.

Figure 3A:
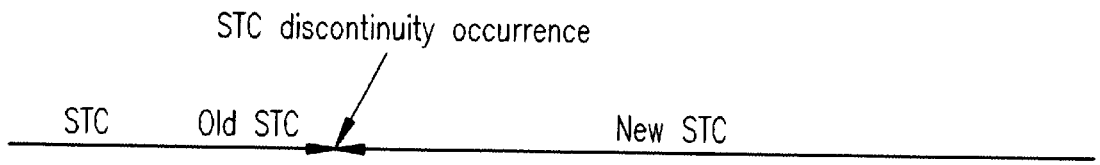
FIGS. 3a to 3e are timing charts of the picture data during a STC discontinuity.
Figure 3B:
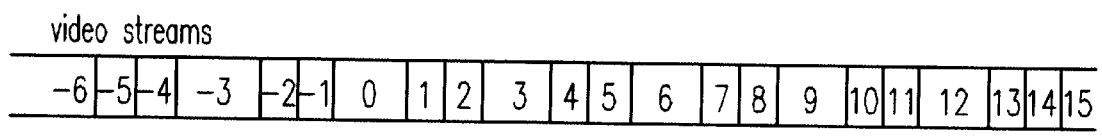
Figure 3C:
Figure 3D:
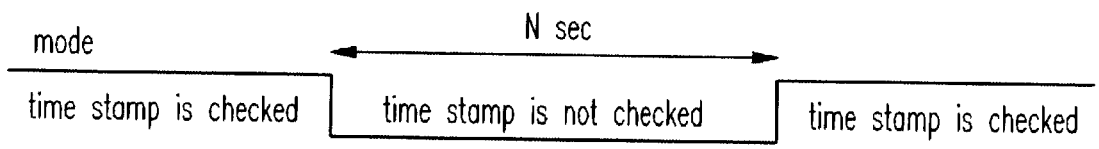
Figure 3E:
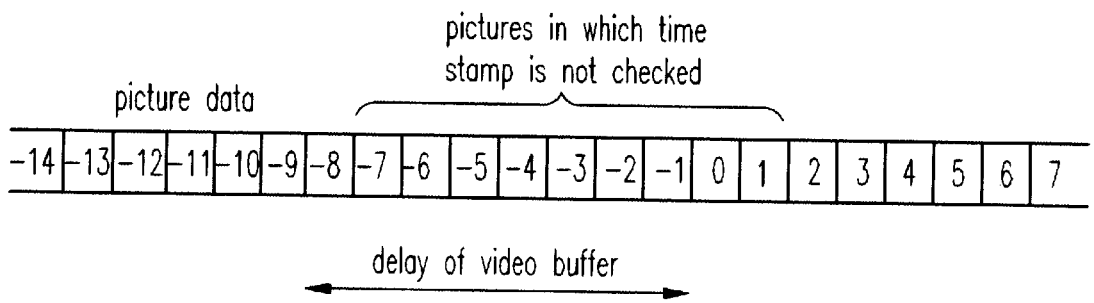

For example, if a STC discontinuity occurs as shown in FIG. 3a, bit streams produced based upon a new STC are input as shown in FIG. 3b. As a result, a discontinuity signal is generated as shown in FIG. 3c. At this time, the bit streams produced in reference to the previous STC are still stored in the video buffer 13 as shown in FIG. 3e.

As discussed above, the audio decoder 13 and the video decoder 15 decode by checking the time stamp based upon the STC to obtain the A/V lip-synchronization. If the discontinuity signal is generated as shown in FIG. 3c, the mode signal generator 21 outputs the mode signal '0' for N seconds as shown in FIG. 3d. During the N seconds, the audio decoder 13 and the video decoder 15 decode based upon the basic synchronization without checking time stamp as shown in FIG. 3e.

By allowing the decoders to decode in reference to the basic synchronization, errors caused by an inconsistency between the STC and the picture data due to delay of the video buffer may temporarily be avoided. If the decoders continuously checks the time stamp to decode regardless of the discontinuity signal, the picture data $\{-7, -6, \ldots -1\}$ produced based upon a previous STC would be decoded by checking the time stamp based upon the new STC rather than the previous STC, causing an error.

The predetermined time period N for which the time stamp is not checked is determined to be greater than the delay time of the video buffer 13. Because the delay time of the video buffer 13 depends on the bit streams, N is greater than the maximum value of the delay time of the video buffer 13. Generally, the delay time of the video buffer 13 does not exceed 0.5 seconds. Accordingly, in the preferred embodiment, N is determined to be greater than 0.5 seconds. On the other hand, N should be minimized to reduce the period in which the time stamp is not checked.

Although the time stamp is not checked during the time a STC discontinuity occurs, the decoders decode by the decoders' own synchronization such that an inconsistency with the A/V lip-synchronization does not occur, even for a brief time period. Moreover, the type of data input to the demultiplexer 11 may also be a transport packet (TP) bit streams or packeted elementary streams (PES) as well as the A/V multiplexed bit streams. The time stamp for the TP or PES type data is multiplexed in a header. However, the A/V bit streams do not have time stamp data. Therefore, the time stamp data may be transmitted using the same bus as the data during a spare time period and the time stamp may be distinguished from the data by flags.

As aforementioned, the MPEG decoder and MPEG decoding control method according to the present invention have the following advantages. If a STC discontinuity occurs due to channel change or editing or other reasons, decoding is performed using the basic synchronization without checking the time stamp for a predetermined time period, such that an error caused by inconsistency between the STC and time stamp due to delay of the video buffer is eliminated. Thus, normal decoding may be performed in correspondence with the A/V lip-synchronization, even in the case of STC discontinuity.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A MPEG decoder comprising:
    an input signal processor restoring a system time clock from the input bit streams, said input signal processor generating and outputting a discontinuity signal if a system time clock discontinuity occurs;

a mode signal generator generating and outputting a first mode signal for a predetermined time period when the discontinuity signal is received;

a decoder decoding the input bit streams based upon a basic synchronization for the predetermined time period if the first mode signal is received, wherein the decoded input bit streams include data received before the system time clock discontinuity in the input bit streams, wherein the decoder comprises, an audio decoder decoding audio bit streams from the input bit streams, and a video decoder decoding video bit streams from the input bit streams;

an audio buffer temporarily storing audio bit streams received from the input signal processor and outputting the audio bit streams to the decoder; and a video buffer temporarily storing video bit streams received from the input signal processor and outputting the video bit streams to the decoder, wherein the temporarily stored audio and video bit streams are not cleared responsive to the system time clock discontinuity.

2. An apparatus of claim 1, wherein the mode signal generator generates and outputs a second mode signal when the discontinuity signal is not received, and wherein the decoder decodes the input bit streams in reference to the system time clock if the second mode signal is received.

3. An apparatus of claim 1, further comprising:

a data buffer temporarily storing the input bit streams received from the input signal processor and outputting the input bit streams to the decoder.

4. An apparatus of claim 3, wherein the predetermined time period is greater than a delay time of the data buffer caused by the system time clock discontinuity.

5. An apparatus of claim 3, wherein the predetermined time period is greater than 0.5 seconds.

6. An apparatus of claim 1, further comprising:

a monitor receiving and displaying the decoded input bit streams from the decoder.

7. An apparatus of claim 1, wherein the input bit stream is fully decoded during the predetermined time period.

8. A MPEG decoder comprising:

an input signal processor restoring a system time clock from the input bit streams, said input signal processor generating and outputting a discontinuity signal if a system time clock discontinuity occurs;

a mode signal generator generating and outputting a first mode signal for a predetermined time period when the discontinuity signal is received, and generating and outputting a second mode signal when the discontinuity signal is not received;

a audio decoder decoding audio bit streams from the input bit streams based upon a basic synchronization for the predetermined time period if the first mode signal is received, and decoding the audio bit streams in reference to the system time clock if the second mode signal is received;

a video decoder decoding video bit streams from the input bit streams based upon a basic synchronization for the predetermined time period if the first mode signal is received, and decoding the video bit streams in reference to the system time clock if the second mode signal is received, wherein at least one of the audio and video decoder decodes already received portions of the corresponding one of the audio and video bit streams when the first mode signal is received;

a data buffer temporarily storing the input bit streams received from the input signal processor and outputting the input bit streams to the decoder, wherein the data buffer comprises, an audio buffer temporarily storing the audio bit streams received from the input signal processor and outputting the audio bit streams to the decoder, and a video buffer temporarily storing the video bit streams received from the input signal processor and outputting the video bit streams to the decoder; and a monitor receiving and displaying the decoded input bit streams from the decoder, wherein the predetermined time period is greater than a delay time of the data buffer caused by the system time clock discontinuity, wherein the audio and video bit streams are fully decoded during the predetermined time period, and wherein the audio and video buffers are not cleared responsive to the first signal.

9. An apparatus of claim 8, wherein the input signal processor restores time stamps based upon the system time clock from the input bit streams; and wherein the audio and video decoder decode the audio and video bit streams, respectively based upon the time stamps if the second mode signal is received.

10. A MPEG decoding method comprising:

restoring a system time clock from the input bit streams, generating and outputting a discontinuity signal if a system time clock discontinuity occurs;

generating and outputting a first mode signal for a predetermined time period when the discontinuity signal is received;

decoding the input bit streams based upon a basic synchronization for the predetermined time period if the first mode signal is received, wherein the decoding the input bit streams decodes already received portions of the input bit stream during the predetermined time period upon receipt of the first mode signal; and temporarily storing the input bit streams prior to decoding and outputting the input bit streams to be decoded, wherein the input bit stream is fully decoded during the predetermined time period, and wherein the temporarily storing the input bit streams further comprises, temporarily storing audio bit streams from the input bit stream prior to decoding and outputting the input bit streams to be decoded, and temporarily storing video bit streams from the input bit stream prior to decoding and outputting the video bit streams to the decoder, wherein the temporarily stored audio and video bit streams are not cleared responsive to the first mode signal.

11. A method of claim 10, further comprising:

generating and outputting a second mode signal when the discontinuity signal is not received; and decoding the input bit streams in reference to the system time clock if the second mode signal is received.

12. A method of claim 10, wherein the decoding further comprises:

decoding audio bit streams from the input bit streams based upon a basic synchronization for the predetermined time period if the first mode signal is received, and decoding the audio bit streams in reference to the system time clock if the second mode signal is received; and decoding video bit streams from the input bit streams based upon a basic synchronization for the predetermined time period if the first mode signal is received, and decoding the video bit streams in reference to the system time clock if the second mode signal is received.

13. A method of claim 10, wherein the predetermined time period is greater than a delay time of the data buffer caused by the system time clock discontinuity.

14. A method of claim 10, wherein the predetermined time period is greater than 0.5 seconds.

15. A method of claim 10, further comprising:

transmitting time stamps based upon the system time clock with flags in the same bus as the input bit streams, if the data type is audio/video bit streams; and receiving and testing the time stamps from the input bit streams using the flags.

* * * * *